US011989796B2

(12) United States Patent
Higuchi et al.

(10) Patent No.: US 11,989,796 B2
(45) Date of Patent: May 21, 2024

(54) PARKING SEEKER DETECTION SYSTEM AND METHOD FOR UPDATING PARKING SPOT DATABASE USING SAME

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 160 days.

(21) Appl. No.: 17/166,405

(22) Filed: Feb. 3, 2021

(65) Prior Publication Data

US 2022/0138889 A1 May 5, 2022

Related U.S. Application Data

(60) Provisional application No. 63/106,969, filed on Oct. 29, 2020.

(51) Int. Cl.
*G06Q 50/40* (2024.01)

(52) U.S. Cl.
CPC .................................... *G06Q 50/40* (2024.01)

(58) Field of Classification Search
CPC ............................... G06Q 50/30; G06Q 50/40
USPC ............................................................ 705/13
See application file for complete search history.

(56) References Cited

U.S. PATENT DOCUMENTS 10,074,276 B2 9/2018 Gaebler et al.
10,529,233 B1 * 1/2020 Vieten .................... G08G 1/147
10,783,725 B1 * 9/2020 Gaudin .................. G07C 5/008
10,964,213 B2 * 3/2021 Obayashi .............. B64C 39/024
2012/0200430 A1 * 8/2012 Spahl ..................... G08G 1/143
340/932.2
2014/0372155 A1 * 12/2014 Wang ..................... G06Q 10/02
705/5

(Continued)

FOREIGN PATENT DOCUMENTS

CN 105390018 A 3/2016
CN 109785661 A 5/2019

(Continued)

OTHER PUBLICATIONS

Takamasa Higuchi and Kentaro Oguchi, Parking availability by noisy sensor measurements of connected vehicles, U.S. Appl. No. 63/009,903, filed Apr. 2020.

(Continued)

*Primary Examiner* — Omar Zeroual
*Assistant Examiner* — Brian Adams Heflin
(74) *Attorney, Agent, or Firm* — Dinsmore & Shohl LLP

(57) ABSTRACT

A parking seeker detection system and method for updating an availability of one or more parking spots of a parking spot database is provided. The method includes determining whether a target vehicle is a registered member vehicle, and in response to determining that the target vehicle is not a registered member vehicle, identifying a target parking spot in which the target vehicle is intending to park and updating an availability of a parking spot of a parking spot database corresponding to the target parking spot.

20 Claims, 5 Drawing Sheets

(56) References Cited

U.S. PATENT DOCUMENTS

| | | | | |
|---|---|---|---|---|
| 2015/0058101 | A1* | 2/2015 | Han | G07B 15/02 705/13 |
| 2016/0117925 | A1 | 4/2016 | Akavaram et al. | |
| 2018/0301031 | A1 | 10/2018 | Naamani et al. | |
| 2018/0349792 | A1 | 12/2018 | Zhao et al. | |
| 2018/0357900 | A1* | 12/2018 | Wang | G06Q 20/00 |
| 2019/0066505 | A1* | 2/2019 | Salvucci | G08G 1/144 |
| 2020/0098271 | A1 | 3/2020 | Beaurepaire | |
| 2020/0258385 | A1* | 8/2020 | Mahajan | G01S 17/931 |
| 2021/0019671 | A1* | 1/2021 | Cao | G06Q 30/0283 |
| 2021/0302180 | A1* | 9/2021 | Kim | G01C 21/3453 |
| 2021/0398424 | A1* | 12/2021 | Lee | G06V 20/586 |

FOREIGN PATENT DOCUMENTS

| | | | | | |
|---|---|---|---|---|---|
| CN | 110834667 | A | * | 2/2020 | B62D 6/00 |
| CN | 110889971 | A | | 3/2020 | |
| CN | 109712392 | B | * | 5/2022 | |
| DE | 102020211235 | A1 | * | 3/2022 | |
| JP | 2016024705 | A | * | 2/2016 | |
| KR | 101173368 | B1 | * | 8/2012 | G08G 1/017 |
| WO | WO-2018035403 | A1 | * | 2/2018 | G05D 1/0088 |

OTHER PUBLICATIONS

Takamasa Higuchi and Kentaro Oguchi, Hierarchical Parking Assistance by Connected Vehicles, U.S. Appl. No. 16/778,816, filed Jan. 13, 2020.

* cited by examiner

PARKING SEEKER DETECTION SYSTEM AND METHOD FOR UPDATING PARKING SPOT DATABASE USING SAME

CROSS-REFERENCE TO RELATED APPLICATION

This application claims priority to U.S. Provisional Patent Application No. 63/106,969, filed Oct. 29, 2020, for "Parking Seeker Detection System And Method For Updating Parking Spot Database Using Same," which is hereby incorporated by reference in its entirety including the drawings.

TECHNICAL FIELD

The present specification generally relates to systems and methods for detecting whether a vehicle is actively seeking a parking spot and, more specifically, systems and methods for updating a parking spot database to reflect availability of parking spots in which a parking seeker is intending to park.

BACKGROUND

Systems may be capable of providing navigation instructions to a requesting vehicle in response to receiving a parking request. In doing so, the navigation instructions specifically direct the requesting vehicle to a parking spot previously determined to be available. However, there may be an instance in which a parking vehicle is intending to park in the parking spot selected by the system such that the parking spot will be occupied by the time the requesting vehicle arrives at the parking spot.

Accordingly, a need exists for improved systems and methods for detecting whether a parking spot is soon to be taken by a vehicle and updating a parking spot database accordingly.

SUMMARY

In one embodiment, a method includes determining whether a target vehicle is a registered member vehicle, and in response to determining that the target vehicle is not a registered member vehicle, identifying a target parking spot in which the target vehicle is intending to park and updating an availability of a parking spot of a parking spot database corresponding to the target parking spot.

In another embodiment, a parking vehicle detection system includes a server. The server includes a parking spot database including a plurality of parking spots, each of the plurality of parking spots having an availability. The server also includes a controller configured to determine whether a target vehicle is a registered member vehicle, and in response to determining that the target vehicle is not a registered member vehicle, identify a target parking spot in which the target vehicle is intending to park and updating the availability of a parking spot of the parking spot database corresponding to the target parking spot.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
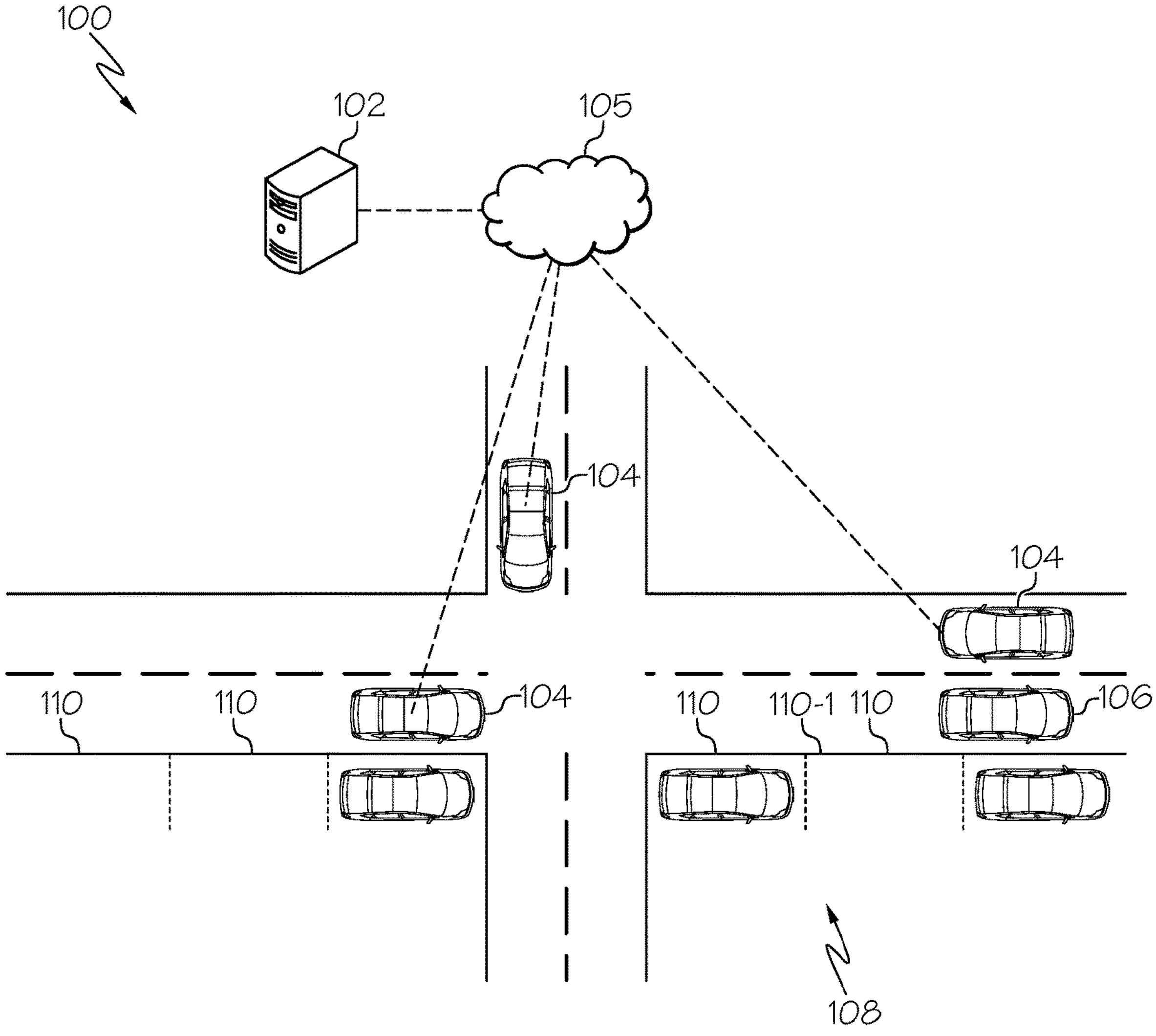
FIG. 1 schematically depicts a parking seeker detection system and a plurality of detecting vehicles on a parking area according to one or more embodiments shown and described herein.

Embodiments described herein are directed to a parking seeker detection system and methods for identifying a parking seeker such that a parking spot database can be updated to reflect availability of the parking spot in which the parking seeker is intending to park. The parking seeker detection system includes a server including a parking spot database including a plurality of parking spots having associated an availability, and a controller configured to identify a parking seeker and a target parking spot in which a target vehicle is intending to park. The controller receives target vehicle data from one or more detecting devices or detecting vehicles capturing identification data and driving behavior data of the target vehicle. By updating the parking spot database to reflect that target parking spots may be occupied by the target vehicle intending to park, the server may avoid sending navigation instructions to vehicles to park in a parking spot that is soon to be occupied by the target vehicle.

Various embodiments of the parking seeker detection system and the operation of the parking seeker detection system are described in more detail herein. Whenever possible, the same reference numerals will be used throughout the drawings to refer to the same or like parts.

Referring now to FIG. 1, a parking seeker detection system 100 is illustrated according to one or more embodiments described herein. The parking seeker detection system 100 is shown generally including a server 102 configured to communicate with one or more detecting vehicles 104 via a network 105. As shown in FIG. 1, a plurality of detecting vehicles 104 are depicted. However, as described herein, it should be appreciated that the detecting vehicles 104 may be any suitable device such as a stationary sensor mounted to a building or traffic light, for example, a security camera, for collecting driving data of another vehicle. Each of the plurality of vehicle 104 may be an automobile or any other passenger or non-passenger vehicle such as, for example, a terrestrial, aquatic, and/or airborne vehicle including, but not limited, a bus, a scooter, a drone, and a bicycle. In some embodiments, each of the plurality of the vehicle 104 may be an autonomous vehicle that navigates its environment with limited human input or without human input.

The server 102 may be a remote server such as a cloud server. In some embodiments, the server 102 may be a local server including, but not limited to, a roadside unit, an edge server, and the like. The server 102 may communicate with the detecting vehicle 104 in an area covered by the server 102. The server 102 may communicate with other servers that cover different areas. The server 102 may communicate with a remote server and transmit information collected by the server 102 to the remote server.

Referring still to FIG. 1, at least one detecting vehicle 104 and at least one target vehicle 106 are illustrated in a parking area 108 including a plurality of parking spots 110. In embodiments, the parking area 108 may be a parking lot, a parking structure including multiple levels, a roadway including parking spots on a side of individual streets of the roadway, and the like. As shown, the parking area 108 is a roadway including a plurality of parking spots 110 on a side of a street of the roadway.

In embodiments, each detecting vehicle 104 may be a stationary or parked vehicle, a moving vehicle, a manual vehicle, an autonomous vehicle, or the like. In the embodiment illustrated, a plurality of detecting vehicles 104 are provided at various locations of the parking area 108 and may have different trajectories. As shown, a target vehicle 106 is illustrated in the parking area and performing a parking operation in a target parking spot 110-1 of the plurality of parking spots 110. As described herein, the detecting vehicles 104 capture target vehicle data of the target vehicle 106, which, in some embodiments, is transmitted to the server 102 to determine whether the target vehicle 106 is a parking seeker, i.e., intending to park in one of the parking spots 110 of the parking area 108. To determine whether the target vehicle 106 is a parking seeker, target vehicle data of the target vehicle 106 captured by each of the detecting vehicles 104 may analyzed by the server 102, as described in more detail herein. In other embodiments, the determination may be made at the detecting vehicle 104 itself and subsequently transmitted to the server 102 for further processing. This may reduce communication overhead for uploading raw sensor data to the server 102.

The target vehicle data is utilized to identify one or more target parking spots 110-1 of the parking spots 110 in which the target vehicle 106 is intending to park. In embodiments, the server 102 may identify a single target parking spot 110-1 in which the target vehicle 106 is intending to park when the target vehicle data provides a degree of confidence above a threshold that the target vehicle 106 is parking in a specific target parking spot 110-1. In other embodiments, the server 102 may identify a plurality of target parking spots 110-1 in which the target vehicle 106 may be intending to park. This occurs when the degree of confidence is below a threshold. In embodiments, the target vehicle data is used to update a parking spot database in the server 102 to reflect an availability of the parking spots 110 based on the target vehicle data captured by the detecting vehicles 104. In embodiments in which the server 102 provides instructions to member vehicles to park in a parking spot, updating the parking spot database to reflect that the target parking spot 110-1 may be occupied by the target vehicle 106, the server 102 is prevented from instructing one or more vehicles to park in a parking spot that may be occupied by another vehicle.

Figure 2:
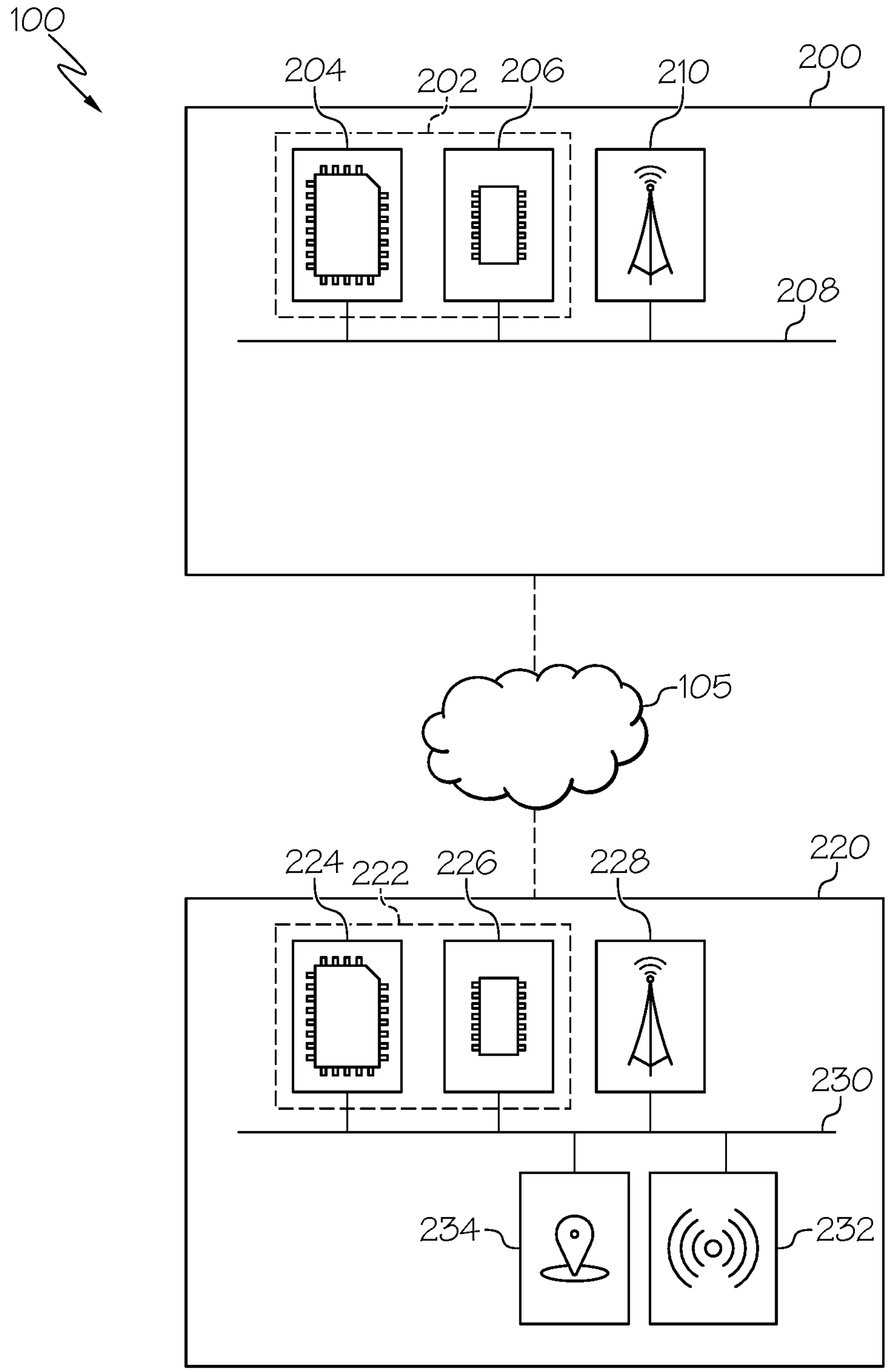
FIG. 2 schematically depicts a server system of the parking seeker detection system communicating with a vehicle system according to one or more embodiments shown and described herein.

FIG. 2 depicts a schematic diagram of the parking seeker detection system 100 including a server system 200 configured to communicate with a vehicle system 220, according to one or more embodiments shown and described herein. It is noted that, while the server system 200 and the vehicle system 220 are depicted in isolation, each of the server system 200 and the vehicle system 220 may be included within the server 102 and the detecting vehicle 104 of FIG. 1, respectively. Further, while the server system 200 is illustrated as communicating with only one vehicle system 220 via the network 105, a vehicle system 220 may be provided for a plurality of detecting vehicles communicating with the server.

The server system 200 includes a controller 202 including one or more processors 204 and one or more memory modules 206. Each of the one or more processors 204 may be any device capable of executing machine readable and executable instructions. Accordingly, each of the one or more processors 204 may be a controller, an integrated circuit, a microchip, a computer, or any other computing device. The one or more processors 204 are coupled to a communication path 208 that provides signal interconnectivity between various modules of the server system 200. Accordingly, the communication path 208 may communicatively couple any number of processors 204 with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 208 may be formed from any medium that is capable of transmitting a signal such as, for example, conductive wires, conductive traces, optical waveguides, or the like. In some embodiments, the communication path 208 may facilitate the transmission of wireless signals, such as WiFi, Bluetooth®, Near Field Communication (NFC) and the like. Moreover, the communication path 208 may be formed from a combination of mediums capable of transmitting signals. In one embodiment, the communication path 208 comprises a combination of conductive traces, conductive wires, connectors, and buses that cooperate to permit the transmission of electrical data signals to components such as processors, memories, sensors, input devices, output devices, and communication devices. Accordingly, the communication path 208 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the server system 200 includes one or more memory modules 206 coupled to the communication path 208. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the server system 200 includes network interface hardware 210 for communicatively coupling the server system 200 to the vehicle system 220. The network interface hardware 210 can be communicatively coupled to the communication path 208 and can be any device capable of receiving and transmitting data via the network 105. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 210 includes hardware configured to operate in accordance with the Bluetooth® wireless communication protocol. For example, the network interface hardware 210 of the server system 200 may receive target vehicle data from the vehicle system 220 for updating an availability of the parking spots in the parking spot database of the server system 200. In some embodiments, the server system 200 may receive a parking request from a vehicle, e.g., a registered member vehicle, indicating a request to park in a particular parking area. As described herein, in response to the server system 200 receiving the parking request, the server system 200 may transmit navigation information to the vehicle system of the member vehicle directing the member vehicle to an available parking spot based on parking spot availability information from the parking spot database.

Still referring to FIG. 2, the server system 200 may be communicatively coupled to the vehicle system 220 by the network 105. In one embodiment, the network 105 may include one or more computer networks (e.g., a personal area network, a local area network, or a wide area network), cellular networks, satellite networks and/or a global positioning system and combinations thereof. Accordingly, the server system 200 can be communicatively coupled to the network 105 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the vehicle system 220 includes a controller 222 including one or more processors 224 and one or more memory modules 226, network interface hardware 228, and a communication path 230 communicatively connected to the other components of the vehicle system 220. The components of the vehicle system 220 may be structurally similar to and have similar functions as the corresponding components of the server system 200 (e.g., the one or more processors 224 corresponds to the one or more processors 204, the one or more memory modules 226 corresponds to the one or more memory modules 206, the network interface hardware 228 corresponds to the network interface hardware 210, and the communication path 230 corresponds to the communication path 208).

Referring still to FIG. 2, the vehicle system 220 may include one or more imaging devices 232 such as, for example, a camera. In some embodiments, the one or more imaging devices 232 may include one or more optical components, such as a mirror, fish-eye lens, or any other type of lens. In some embodiments, the one or more imaging devices 232 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein may include one or more LIDAR sensors, radar sensors, sonar sensors, or other types of sensors and that such data could be integrated into or supplement the data collection as described herein. Specifically, the one or more imaging devices 232 of the vehicle system 220 capture target vehicle data of the target vehicle, which is then transmitted to the server system 200.

The vehicle system 220 includes a location sensor 234 communicatively coupled to the other components of the vehicle system 220 via the communication path 230. The location sensor 234 may be, for example, a GPS module, configured to capture location data indicating a location of the detecting vehicle 104, which may be transmitted to the server system 200. The location data is utilized to correlate captured target vehicle data of a target vehicle 106 with other captured target vehicle data of the target vehicle 106 received from other detecting vehicles 104. Further, the location data is utilized to correlate a target parking spot 110-1 in which the target vehicle 106 may be parking with an associated parking spot in the parking spot database of the server system 200 having a known location.

Figure 3:
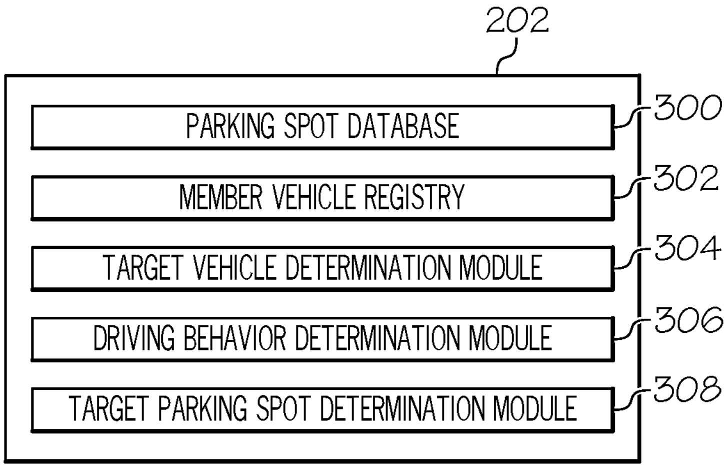
FIG. 3 schematically depicts a controller of the server system according to one or more embodiments shown and described herein.

Referring now to FIG. 3, the controller 202 of the server system 200 is shown with reference to the parking area 108 in FIG. 1. In embodiments, the controller 202 generally includes a parking spot database 300, a member vehicle registry 302, a target vehicle determination module 304, a driving behavior determination module 306, and a target parking spot determination module 308. The parking spot database 300 includes, in some embodiments, a plurality of maps of parking areas identifying parking spots within each of the parking areas. Each of the parking spots has an assigned location within the parking area, for example, geographic coordinates, such that target vehicle data received from a detecting vehicle 104 may be associated with a corresponding parking spot of the parking spot database 300 based on a detected location of the detecting vehicle 104 when the target vehicle data was captured. Each parking spot in the parking spot database 300 has an assigned availability, which may be updated by the target parking spot determination module 308. In some embodiments, the availability of each parking spot of the parking spot database 300 may be a discrete availability such as, for example, "occupied" or "available." In other embodiments, the availability of each parking spot of the parking spot database 300 may be a probability ranging between a lower limit, such as 0.0 indicating a high likelihood that the parking spot is occupied by another vehicle, and an upper limit, such as 1.0 indicating a high likelihood that the parking spot is available.

The member vehicle registry 302 includes a listing of vehicles, i.e., member vehicles, that are registered with the parking seeker detection system 100. Vehicles may register with the parking seeker detection system 100 in any suitable manner such as through a website, application, or other network-accessible platform. The vehicle may be registered using a computing device, such as a mobile computing device, or by using a user interface of the vehicle itself communicating with the server. When registering a vehicle with the parking seeker detection system 100, the member vehicle registry 302 collects vehicle information of the vehicle such as, for example, a color, a make and/or model, a license plate number of the vehicle, and other identifying information of the vehicle. This vehicle information is stored and utilized to determine whether a target vehicle 106 detected by one or more detecting vehicles 104 is a member vehicle registered with the parking seeker detection system 100. Member vehicles may be capable of identifying a parking spot in which the member vehicle is parking. Further, member vehicles may communicate with the parking spot database 300 to update an availability of the parking spot. Thus, it may not be necessary for a detecting vehicle 104 to continue to collect target vehicle data of a target vehicle 106 and/or for the server 102 to analyze target vehicle data of the target vehicle 106 once it is determined that the target vehicle 106 is a member vehicle.

As such, the target vehicle determination module 304 receives and analyzes target vehicle data from the one or more detecting vehicles 104 to determine whether the target vehicle 106 is a member vehicle registered with the parking seeker detection system 100. The target vehicle determination module 304 may receive target vehicle data including identification data such as, for example, a color, a make and/or model, a license plate number of the target vehicle 106, and other identifying information of the target vehicle 106. Each detecting vehicle 104 may collect this identification data using the one or more imaging devices 232 of the detecting vehicle 104. Specifically, the imaging device 232 of each detecting vehicle 104 may be configured to capture image data of the target vehicle 106 and transmit this image data as identification data to the server 102, specifically the target vehicle determination module 304, to determine whether the target vehicle 106 is a member vehicle by comparing the identification data with that of the member vehicles stored in the member vehicle registry 302. In some embodiments, the identification data may include a location, speed, a trajectory, or any combination thereof of the target vehicle 106. The location, speed, and/or trajectory of the target vehicle 106 captured by one or more detecting vehicles 104 may be compared to a known location, speed, and/or trajectory of member vehicles, which may be periodically collected and stored within the member vehicle registry 302, to determine whether the target vehicle 106 is a member vehicle. In some embodiments, it should be appreciated that the target vehicle determination module 304, the driving behavior determination module 306, and/or the target parking spot determination module 308 may be included in the controller 222 of the vehicle system 220, as opposed to the controller 202 of the server system 200. As such, the detecting vehicle 104 may be equipped to determine whether the target vehicle 106 is a member vehicle, determine a driving behavior of the target vehicle 106, and/or identify a target parking spot in which the target vehicle 106 is intending to park. This reduces the communication overhead of uploading the sensor data itself to the server 102. In this embodiment, the server 102 may still be configured to complete or confirm any of the above determinations, as well as carrying out the updating of the parking spot database 300.

If the target vehicle determination module 304 does not determine that the target vehicle 106 is a member vehicle, the driving behavior determination module 306 analyzes target vehicle data received from the one or more detecting vehicles 104 to determine a driving behavior of the target vehicle 106. Specifically, the driving behavior determination module 306 receives driving behavior data of the target vehicle 106 data such as, for example, a speed, changes in speed, an active turn signal, and the like, of the target vehicle 106. The driving behavior determination module 306 analyzes the driving behavior data to determine whether the target vehicle 106 is a parking seeker, i.e., actively intending to park in a target parking spot 110-1, based on the driving behavior data collected of the target vehicle 106.

In response to determining that the target vehicle 106 is a parking seeker, the target parking spot determination module 308 identifies one or more target parking spots 110-1 of the plurality of parking spots 110 that the target vehicle 106 is intending to park. The target parking spot determination module 308 is communicatively coupled to the parking spot database 300 such that the availability of each of the parking spots may be updated in the parking spot database 300 to reflect that a parking spot in the parking spot database 300 associated with the target parking spot 110-1 identified by the target parking spot determination module 308 is no longer available, i.e., occupied. As described herein, the target parking spot determination module 308 may identify a single parking spot 110 as the target parking spot 110-1 if a degree of confidence that the target vehicle 106 is intending to park in the target parking spot 110-1 exceeds a threshold. Alternatively, the target parking spot determination module 308 may identify more than one parking spot 110 if the degree of confidence that the target vehicle 106 is intending to park in the target parking spot 110-1 is below the threshold. In this instance, each parking spot in the parking spot database 300 corresponding to an associated one of the target parking spots 110-1 may be assigned a probability ranging between a lower limit and an upper limit indicating a likelihood as to whether the target parking spot 110-1 is going to be occupied by the target vehicle 106.

Figure 4:
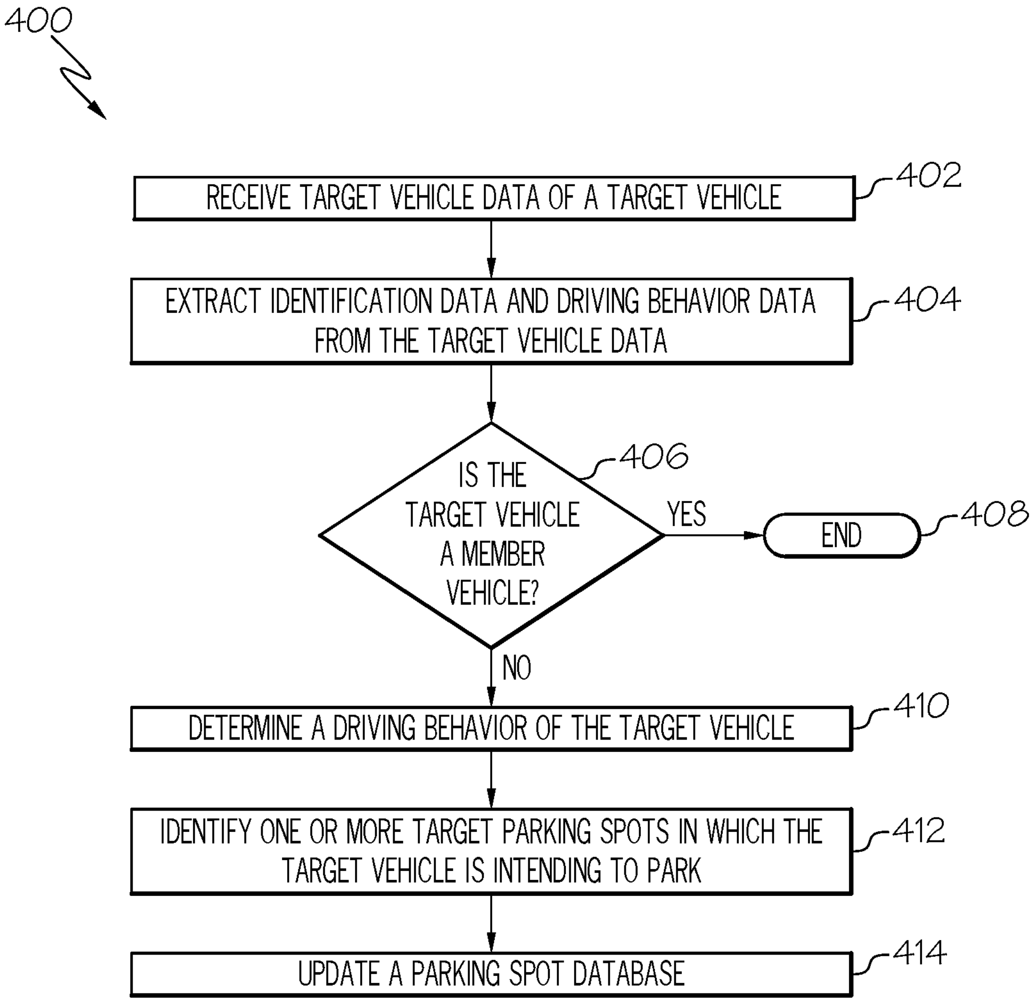
FIG. 4 schematically depicts a flowchart of a method for identifying a target parking spot in which a target vehicle is intending to park according to one or more embodiments shown and described herein.

FIG. 4 depicts a method 400 for determining a parking spot in which a vehicle will be parking and updating a parking spot database to reflect an availability of the parking spot, according to one or more embodiments shown and described herein. The method 400 is described herein with reference to FIGS. 1-3.

At step 402, the server 102 receives target vehicle data of the target vehicle 106 collected by one or more detecting vehicles 104. It should be appreciated that, in some embodiments, a detecting vehicle 104 collects target vehicle data of each vehicle within a particular range of the detecting vehicle 104. Thus, each vehicle passing the detecting vehicle 104 may be initially identified as a target vehicle 106 of which target vehicle data is to be captured. The detecting vehicle 104 captures the target vehicle data of the target vehicle 106 using one or more imaging devices 232 of the detecting vehicle 104 as described above. As such, these imaging devices 232 may include one or more cameras, LIDAR sensors, radar sensors, sonar sensors, and the like. The target vehicle data captured by the imaging device 232 includes identification data such as, for example, a speed, a trajectory, a color, a make and/or model, a license plate number, and the like of the target vehicle 106, and driving behavior data such as, for example, a speed, frequent changes in speed, an active turn signal, and the like, of the target vehicle 106. The target vehicle data include time series data associated therewith such that the target vehicle data captured by one detecting vehicle 104 can be compared to target vehicle data captured by another detecting vehicle 104 to determine whether the target vehicle data received from each detecting vehicle 104 pertains to the same target vehicle 106. For example, if target vehicle data captured by a first detecting vehicle 104 indicates a speed and/or trajectory of a target vehicle 106 at one location and a second detecting vehicle 104 indicates a speed and/or trajectory of a target vehicle 106 at another location, it may be possible to confirm that the target vehicle 106 captured by the first and second detecting vehicles 104 is the same target vehicle 106. In some embodiments, the detecting vehicle 106 transmits the entire target vehicle data detected by the imaging device 232 to the server 102. In other embodiments, the detecting vehicle 104 discards portions of the target vehicle data captured that is unrelated to the identification data and the driving behavior data to reduce the size of the transmission from the detecting vehicle 104 to the server 102.

At step 404, the server 102 extracts the identification data and the driving behavior data from the target vehicle data of a target vehicle 106 received from the one or more detecting vehicles 104. The identification data is provided to the target vehicle determination module 304 for processing and the driving behavior data may be provided to the driving behavior determination module 306. At step 406, the target vehicle determination module 304 analyzes the identification data received from each detecting vehicle 104 based on the vehicle information of each member vehicle stored within the member vehicle registry 302. In embodiments, identification data received from a plurality of detecting vehicles 104 may be utilized to identify a speed and/or trajectory of a target vehicle 106 to more accurately compare the identification data to vehicle information data within the member vehicle registry 302. If the identification data of a particular target vehicle 106 matches the identification data of a member vehicle within the member vehicle registry 302, then the target vehicle data is discarded from the server 102 as the particular target vehicle 106, i.e., a member vehicle, will automatically update the availability of a parking spot in the parking spot database 300 upon performing a parking operation. Accordingly, at step 408, the method 400 ends if the target vehicle 106 is identified as a member vehicle.

Alternatively, if it is determined that the target vehicle 106 is not a member vehicle, the driving behavior determination module 306 proceeds to analyze the driving behavior data of the target vehicle 106 at step 410 to determine whether the target vehicle 106 is intending to park in a parking spot 110, i.e., is a parking seeker. As a non-limiting example, the driving behavior determination module 306 may determine that the target vehicle 106 is a parking seeker if the driving behavior data indicates that the target vehicle 106 is frequently changing its speed such as slowing down, activating a turn signal proximate or within a predetermined range of an available parking spot, activating the reverse tail lights of the vehicle proximate or within a predetermined range of an available parking spot, repeatedly circling a particular area of the parking area 108, or any combination thereof. It should be appreciated that each of these behaviors indicate an intent to park in a parking spot 110. Further, the driving behavior determination module 306 may determine whether the target vehicle 106 is intending to park in a target parking spot 110-1 using a machine learning algorithm, which receives the driving behavior data as inputs.

In some embodiments, a detecting vehicle 104, especially when the detecting vehicle 104 is moving in an opposite direction as the target vehicle 106, may not be able to collect a sufficient amount of target vehicle data for the driving behavior determination module 306 to determine a driving behavior of the target vehicle 106. Thus, as discussed herein, driving behavior data of the same target vehicle 106 captured by imaging devices 232 of different detecting vehicles 104 may be relied on to more accurately determine a driving behavior of a target vehicle 106. The driving behavior data received from a plurality of detecting vehicles 104 is initially analyzed to identify a similar target vehicle 106 of which the driving behavior data was captured and, subsequently, the driving behavior data is arranged based on time series data associated with the driving behavior data to illustrate a driving pattern of the target vehicle 106 over a longer length of time or distance than that which would be provided by only one detecting vehicle 104. As a result, the driving behavior determination module 306 may be able to determine changes in a speed of the target vehicle 106 or whether the target vehicle 106 is circling a specific area of the parking area 108 based on the driving behavior data of the target vehicle 106 captured by more than one detecting vehicle 104.

In embodiments, if the driving behavior determination module 306 determines that the target vehicle 106 is a member vehicle or not a parking seeker, the server 102 may discard the target vehicle data to prevent unnecessary data from accumulating within the server 102. In embodiments, the target vehicle data may be discarded only after the driving behavior determination module 306 determines with a level of confidence exceeding a threshold confidence level that the target vehicle 106 is a member vehicle or not a parking seeker. In instances in which the level of confidence is below the threshold confidence level after analyzing the driving behavior data of the target vehicle 106 received from a detecting vehicle 104, the determination may be confirmed after further analyzing driving behavior data of the target vehicle 106 received from another detecting vehicle 104. In response, the level of confidence may exceed the threshold confidence level and the driving behavior data of the target vehicle 106 may be discarded.

In response to the driving behavior determination module 306 determining that the target vehicle 106 is a parking seeker, the target parking spot determination module 308 identifies one or more target parking spots 110-1 in which the target vehicle 106 is intending to park at step 412. In instances in which the driving behavior determination module 306 determines that the target vehicle 106 is intending to park and only one available parking spot 110 is located proximate the target vehicle 106, the target parking spot determination module 308 may determine with a high degree of confidence that the available parking spot 110 is the target parking spot 110-1. However, in embodiments in which a plurality of available parking spots 110 are proximate the target vehicle 106 when intending to park, the target parking spot determination module 308 may identify each of the available parking spots 110 as a target parking spot 110-1. Further, the target parking spot determination module 308 may assign a probability to each parking spot in the parking spot database 300 corresponding to the target parking spots 110-1 indicating a likelihood that the target vehicle 106 is intending to park in each target parking spot 110-1. For example, a parking spot in the parking spot database 300 corresponding to a target parking spot 110-1 closer to the target vehicle 106 may receive a probability closer to a lower limit, indicating a high likelihood that the parking spot will be occupied, as compared to another parking spot corresponding to a target parking spot 110-1 farther from the target vehicle 106.

It should be appreciated that the target parking spots 110-1 are identified based on location data of the detecting vehicles 104 when the target vehicle data is captured, which is transmitted to the server 102 with the target vehicle data. However, as discussed herein, it should be appreciated that the processes described in steps 402-412 may be executed at the detecting vehicle 104 rather than the server 102. Specifically, the detecting vehicle 104 may include the target vehicle determination module 304, the driving behavior determination module 306, and/or the target parking spot determination module 308. As such, the detecting vehicle 104 may be equipped to determine whether the target vehicle 106 is a member vehicle (step 406), determine a driving behavior of the target vehicle 106 (step 410), and/or identify a target parking spot in which the target vehicle 106 is intending to park (step 412). This reduces the communication overhead of uploading the sensor data itself to the server 102.

Further, the location data of the detecting vehicles 104 relative to a captured location of the target vehicle 106 when intending to park is compared to an assigned location of each parking spot within the parking spot database 300 of the server 102. Thus, at step 414, the one or more target parking spots 110-1 are matched to corresponding parking spots within the parking spot database 300 and the availability of the parking spots within the parking spot database 300 is updated to reflect that the target vehicle 106 is or may be parking in one of the parking spots. For example, the availability of a parking spot within the parking spot database 300 may be changed to "occupied" if it is determined that the target vehicle 106 is parking in a target parking spot 110-1 corresponding to that parking spot. Alternatively, the availability of one or more parking spots within the parking spot database 300 may be provided with an updated probability indicating varying likelihoods that the parking spot will be occupied based on the probability of each target parking spot 110-1 determined in step 412. Accordingly, the parking spot database 300 is updated to indicate that one or more parking spots may not be available based on the driving behavior determination module 306 determining that the target vehicle 106 is intending to park and the target parking spot determination module 308 identifying which target parking spot 110-1 the target vehicle 106 is intending to park in. By updating the parking spot database 300 to reflect which parking spots may not be available, it is possible to reduce the likelihood of member vehicles being instructed by the same parking spot or a parking spot that is soon to be occupied by a parking seeker.

As noted above, the parking seeker detection system 100 may be may be suitable for updating an availability of parking spots in a parking spot database to indicate whether corresponding parking spots in a parking area are occupied or available or, alternatively, a probability or likelihood that the parking spots may be occupied or available shortly. In some embodiments, this information may be utilized to identify the number of available parking spots in a given area or zone of a parking area in substantially real time. As such, this information may be provided to a member vehicle in response to receiving a parking request from the member vehicle indicating an intent to park in the parking area.

Figure 5:
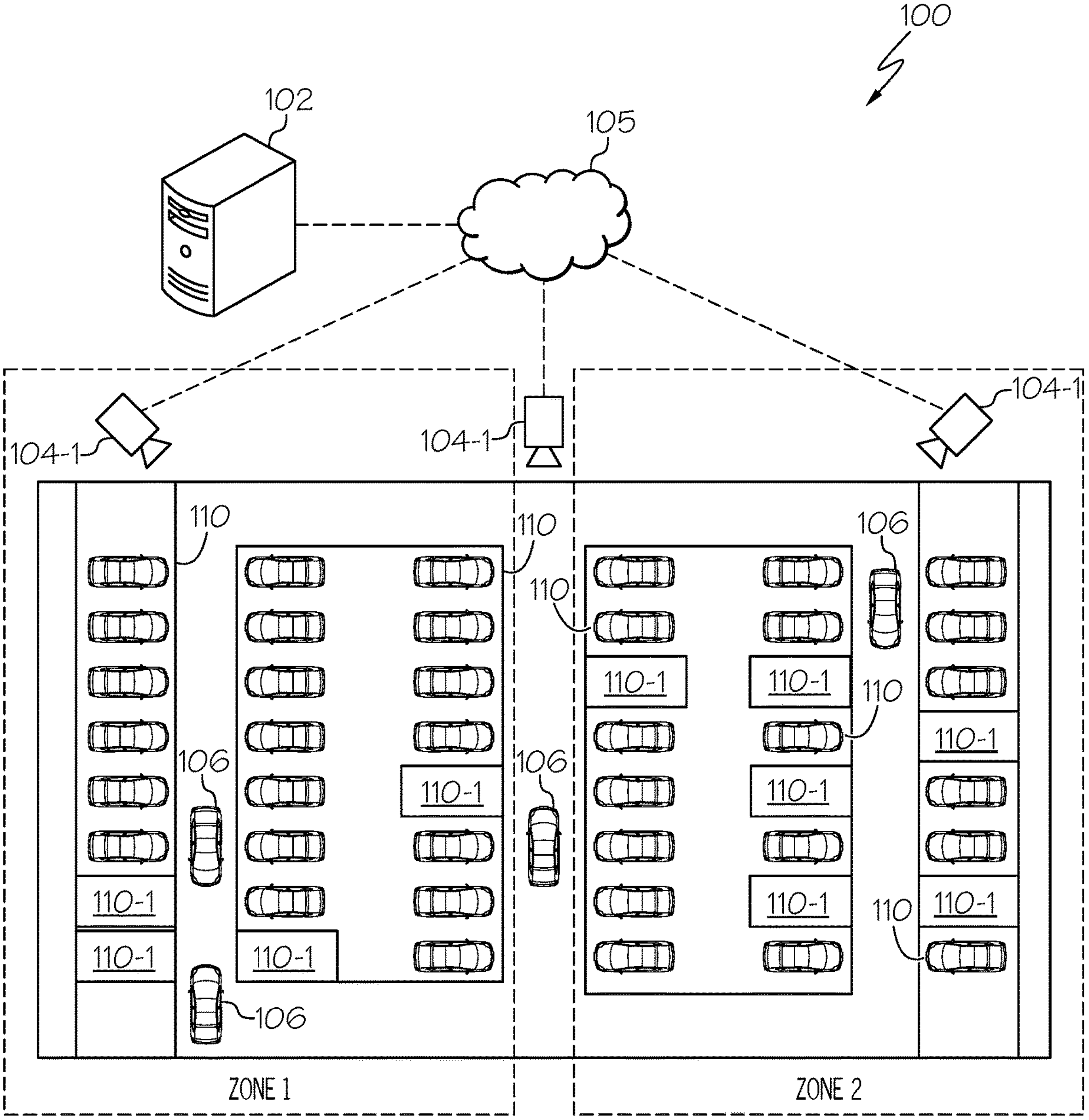
FIG. 5 schematically depicts the parking seeker detection system and a plurality of detecting vehicles on a parking area including a plurality of zones according to one or more embodiments shown and described herein.

FIG. 5 depicts the parking seeker detection system utilized to provide parking spot availability information to a member vehicle upon receiving a parking request. As shown, a parking area 108-1 is illustrated as a parking lot, rather than the parking area 108 depicted in FIG. 1. However, like reference numerals will be used to indicate like parts. The parking area 108-1 is separated into a plurality of zones, e.g., zone 1 and zone 2, with each zone including a plurality of parking spots 110. While the zones are illustrated as being adjacent one another, in some embodiments, any number of zones may be provided at different locations and/or on different levels of the parking area 108-1. As shown, one or more target vehicles 106 are illustrated as driving in the parking area 108-1. A plurality of detecting devices 104-1 are provided in the parking area 108-1 for capturing target vehicle data of one or more target vehicles 106 in the manner described herein with respect to the detecting vehicles 104. As with the detecting vehicles 104 shown in FIG. 1, the detecting devices 104-1 may include one or more imaging devices, such as imaging device 232, for capturing the target vehicle data of the target vehicles 106. Accordingly, the server 102 is configured to receive the target vehicle data from the detecting devices 104 (step 402), determine whether a detected target vehicle 106 is a member vehicle (step 406), determine a driving behavior of the target vehicle 106 (step 410), identify one or more target parking spots 110-1 (step 412), and update the parking spot database 300 (step 414). As such, the detecting devices 104 may determine that one or more of the target vehicles 106 in the zones are parking seekers and, as a result, determine that target parking spots 110-1 may be occupied shortly.

As discussed herein, the parking spots within the parking spot database 300 have a known location associated with them. In addition, each parking spot may be assigned a zone based on the location of the parking spot. As such, the parking spot database 300 may be configured to determine how many available, or likely to be available, parking spots are in each zone. In some embodiments, the server 102 receives a parking request from a member vehicle and transmits the available number of parking spots in each zone to the member vehicle to be displayed in the member vehicle, such as on a user display interface, heads-up display, or other vehicle display device. In addition, the server 102 may transmit the total number of parking spots in each zone, which allows the driver of the member vehicle to better determine where to look for a parking spot to increase the chances of finding a parking spot.

Referring still to FIG. 5, as a non-limiting example, zone 1 and zone 2 each has a total of 24 parking spots 110 and the server 102 may identify four target vehicles 106 as parking seekers intending to park. More particularly, zone 1 has four available, or likely to be available, parking spots 110, and zone 2 has six available, or likely to be available, parking spots 110, as determined by the server 102 based on the availability of the parking spots 110 indicated in the parking spot database 300. Thus, when the server 102 determines that three of the target vehicles 106 are intending to park in target parking spots 110-1 of zone 1, the server 102 updates the availability of corresponding parking spots in the parking spot database 300 and may transmit to the member vehicle that zone 1 has only one parking spot 110 available out of a total of 24 parking spots 110. Similarly, when the server 102 determines that one of the target vehicles 106 are intending to park in the target parking spots 110-1 of zone 2, the server 102 updates the availability of those corresponding parking spots in the parking spot database 300 and may transmit to the member vehicle that zone 2 has a total of five parking spots 110 available out of a total of 24 parking spots 110. By providing this availability information particular to each zone of the parking area, the member vehicle can select which zone to look for a parking spot in based on the availability determined by the server 102.

From the above, it is to be appreciated that defined herein is a parking seeker detection system and methods for identifying a parking seeker such that a parking spot database can be updated to reflect availability of the parking spot in which the parking seeker is intending to park. By updating the parking spot database to reflect that one or more target spots may be occupied by the parking seeker identified as performing a parking operation, the server may avoid sending navigation instructions to vehicles to park in a parking spot that is soon to be occupied by the parking seeker.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

receiving, at a server, target vehicle data of a target vehicle from a plurality of imaging devices, each of the plurality of imaging devices incorporated into a respective detecting vehicle, the target vehicle data including identification data and driving behavior data;

determining, by the server, whether the target vehicle is a registered member vehicle;

in response to determining that the target vehicle is not the registered member vehicle, determining, by the server, whether a driving behavior of the target vehicle indicates an intent to park by comparing, at a respective detecting vehicle, the driving behavior data received from each of the plurality of imaging devices, identifying a target parking spot in which the target vehicle is intending to park based on a proximity of the target vehicle to the target parking spot, and updating an availability of a parking spot of a parking spot database corresponding to the target parking spot prior to the target vehicle entering the target parking spot; and in response to updating the parking spot database, transmitting navigation information to a controller of a member vehicle by the server to direct the member vehicle to an available parking spot based on parking spot availability information from the updated parking spot database.

2. The method of claim 1, further comprising:

determining whether the target vehicle is the registered member vehicle based on the identification data.

3. The method of claim 2, further comprising:

associating the target parking spot with a corresponding parking spot of the database based on a known location of the parking spot and a current location of the one or more detecting vehicles when the target vehicle data is captured.

4. The method of claim 3, further comprising:

associating the target parking spot with a corresponding one of one or more parking spots of the database based on a location of the target parking spot relative to the one or more detecting vehicles.

5. The method of claim 3, wherein updating the availability of the parking spot of the parking spot database further comprises assigning the parking spot a probability that the target vehicle is intending to park in the parking spot.

6. The method of claim 5, wherein the driving behavior data includes time-series data received from the one or more of detecting vehicles.

7. The method of claim 2, wherein the plurality of imaging devices of the one or more detecting vehicles comprises one or more of an optical sensor, a LiDAR sensor, a radar sensor, a laser sensor, and a proximity sensor.

8. The method of claim 2, wherein the identification data includes one or more of a speed, a trajectory, a color, a make and/or model, and a license plate number of the target vehicle.

9. The method of claim 2, wherein the driving behavior data includes one or more of a speed, frequent changes in speed, and an active turn signal of the target vehicle.

10. The method of claim 9, further comprising:

analyzing the driving behavior data using a machine learning algorithm to determine if the target vehicle indicates an intent to park.

11. The method of claim 2, further comprising:

in response to determining that the target vehicle is a registered member vehicle, discarding the target vehicle data.

12. A parking vehicle detection system comprising:

a server comprising:

a parking spot database including a plurality of parking spots, each of the plurality of parking spots having an availability; and a controller configured to:

receive target vehicle data of a target vehicle from a plurality of imaging devices, each of the plurality of imaging devices incorporated into a respective detecting vehicle, the target vehicle data including identification data and driving behavior data;

determine whether the target vehicle is a registered member vehicle;

in response to determining that the target vehicle is not the registered member vehicle, determine whether a driving behavior of the target vehicle indicates an intent to park by comparing, at a respective detecting vehicle, the driving behavior data received from each of the plurality of imaging devices, identify a target parking spot in which the target vehicle is intending to park based on a proximity of the target vehicle to the target parking spot, and update the availability of a parking spot of the parking spot database corresponding to the target parking spot prior to the target vehicle entering the target parking spot; and in response to updating the parking spot database, transmit navigation information to a controller of a member vehicle to direct the member vehicle to an available parking spot based on parking spot availability information from the updated parking spot database.

13. The parking vehicle detection system of claim 12, wherein the controller is configured to:

determine whether the target vehicle is the registered member vehicle based on the identification data.

14. The parking vehicle detection system of claim 13, wherein the controller is configured to:

associate the target parking spot with a corresponding parking spot of the parking spot database based on a known location of the parking spot, a current location of the respective detecting vehicle when the target vehicle data is captured, and a location of the target parking spot relative to the respective detecting vehicle.

15. The parking vehicle detection system of claim 14, wherein the target vehicle data includes time-series data received from the respective detecting vehicle.

16. The parking vehicle detection system of claim 13, wherein the respective detecting vehicle comprises one or more of an optical sensor, a LiDAR sensor, a RADAR sensor, a laser sensor, and a proximity sensor.

17. The parking vehicle detection system of claim 13, wherein the identification data includes one or more of a speed, a trajectory, a color, a make and/or model, and a license plate number of the target vehicle.

18. The parking vehicle detection system of claim 13, wherein the driving behavior data includes one or more of a speed, frequent changes in speed, and an active turn signal of the target vehicle.

19. The parking vehicle detection system of claim 18, wherein the controller is configured to:

analyze the driving behavior data using a machine learning algorithm to determine if the target vehicle indicates an intent to park.

20. The parking vehicle detection system of claim 12, wherein the controller is configured to:

in response to determining that the target vehicle is a registered member vehicle, discard the target vehicle data.

* * * * *